United States Patent [19]
Führer et al.

[11] Patent Number: 4,998,600
[45] Date of Patent: Mar. 12, 1991

[54] OIL LUBRICATION SYSTEM FOR THE BEARING OF A SHAFT JOURNAL

[75] Inventors: Gerd Führer, Friedrichshafen; Karl-Fritz Heinzelmann, Meckenbeuren, both of Fed. Rep. of Germany

[73] Assignee: Zahnradfabrik Friedrichshafen AG, Fed. Rep. of Germany

[21] Appl. No.: 318,897

[22] Filed: Mar. 3, 1989

[30] Foreign Application Priority Data

Mar. 9, 1988 [DE] Fed. Rep. of Germany ....... 3807708

[51] Int. Cl.$^5$ .......................... F01M 9/00; F16J 15/54
[52] U.S. Cl. ...................................... 184/6.1; 277/25; 277/95; 277/152; 277/153; 384/478; 384/482; 384/485
[58] Field of Search ................. 184/6.1; 384/478, 482, 384/485; 277/25, 152, 153, 29, 70, 95, DIG. 4

[56] References Cited

U.S. PATENT DOCUMENTS

| 2,936,715 | 5/1960 | Southam | 277/25 |
|---|---|---|---|
| 3,223,196 | 12/1965 | Stott . | |
| 3,627,390 | 12/1971 | Irwin | 384/478 |
| 3,858,950 | 1/1975 | Otto | 277/95 |
| 4,210,339 | 7/1980 | Povejsil | 277/95 |
| 4,457,519 | 7/1984 | Harrington | 277/95 |
| 4,465,285 | 8/1984 | Toyoda | 277/25 |

FOREIGN PATENT DOCUMENTS 1211384 9/1986 Canada .
3238780 1/1984 Fed. Rep. of Germany .

Primary Examiner—Douglas Hart
Attorney, Agent, or Firm—Davis, Bujold & Streck

[57] ABSTRACT

An oil lubrication system for a bearing positioned between two rotatable shafts, especially a pilot bearing (1) for a main shaft (3) in a transmission. The lube oil is fed predominantly radially inwardly on one side (11) of the pilot bearing (1) and is radially drained outwardly on the other side (12) via an annular drainage passage (8) located between the two shafts. An elastic rubber seal (4) is situated in the drainage passage (8) which, during operation, is opened by the centrifugal force or by the pressure of the lube oil pumped through the system and closes the drain passage (8) during downtime of the transmission. The elastic rubber seal (4) can be fastened to the input shaft (2) via a body (44) especially when the sealing lip (41) is to be opened by the centrifugal force. In addition, fastening to the main shaft (3) is also possible when the sealing lip is to be predominantly opened by the oil lube pressure pumped to the pilot bearing (1).

8 Claims, 2 Drawing Sheets

OIL LUBRICATION SYSTEM FOR THE BEARING OF A SHAFT JOURNAL

The invention concerns an oil lubrication system for the bearing of a shaft journal.

The lubrication of pilot bearings of rotating shafts is especially difficult on account of their arrangement which is unfavorable for the feeding of lube oil and heat conduction. Accordingly, many suggestions for supplying lube oil or coolant to such roller bearings, which can be designed as needle bearings, ball bearings, or taper roller bearings, have been made. A forced oil lubrication has predominantly used where lube oil is guided from a lubricant pump directly to the pilot bearing via bores, ducts, etc., and an oil-splash lubrication or oil centrifugal lubrication have also been used mostly in a specially adapted manner. In such cases, the oil thrown upward from the oil bath over the immersed gears is collected in drip pans and fed to the pilot bearing via adequate bores and ducts. The conveyance of the lube oil radially inwardly to the pilot bearings can also be aided by adding a simple pump having a propeller or a conveyor disc, for instance, combined with suitable bores and ducts, such as that disclosed, for instance, in German Patent 3,238,780 or in U.S. Pat. No. 3,223,196. These lubrication systems have proved satisfactory but have a corresponding expense. But in all those systems problems arise after a long interval of non-use, that is, after prolonged downtime, since both in the forced lubrication and in the oil-splash or centrifugal lubrication system the lube oil reaches the pilot bearing only after an excessive interval of time.

Therefore, the problem to be solved by the invention is to further develop an oil lubrication system in a manner such that it is prevented that the pilot bearing runs without oil even after a prolonged downtime. This problem is solved by the presently disclosed oil lubrication system.

By placing a seal, based on the flow direction of the lube oil, behind the pilot bearing and which is open during operation and closed only during downtime, the lube oil that is still in the bearing, between the bearing and the seal, is retained. During operation, the lube oil and the dirt particles that adhere thereto can flow out, without obstacle, and thus a good lubrication and the dissipation of frictional heat are ensured. Precisely, the latter is as important as the good lubrication of the pilot bearing, since the pilot bearing is located at the center of the transmission and does not have sufficient contact with the transmission housing that exist with other bearings members for the favorable heat conduction. The elastic seal also does not hinder the unobstructed assembly of the main shaft upon which the pilot bearing is situated. The arrangement of the elastic rubber seal on the outer shaft, makes possible the construction with an axially extending sealing lip which during downtime—that is without friction—rests snugly on the other shaft (shaft with the journal) while, during operation, the sealing lip is lifted under the action of centrifugal force and an unobstructed oil flow is possible and the sealing lip is not subjected to any friction. The opening of the elastic seal during operation by the centrifugal force can be aided by the pressure of the lubricant which, for instance, originates from the natural pumping capacity of a taper roller bearing as a pilot bearing.

It is naturally a condition that the lube oil be fed to the taper roller bearing through the narrow dimension and drainage take place through the broader dimension.

If the sealing lip of the elastic seal is predominantly opened by the pressure in the oil current, this arrangement is also possible on the implement shaft (main shaft) that rotates more slowly. By using the centrifugal force and the pressure of pumped oil in combination, multiple solutions are possible for arranging the elastic seal and thus absolutely no limitations or the construction result.

The invention is not limited to the combinations of features of the claims. Other logical possibilities of combinations and individual features of the claims result to the expert from the stated problem.

Other details of the invention are explained with reference to drawings and embodiments. In the drawings.

Figure 1:
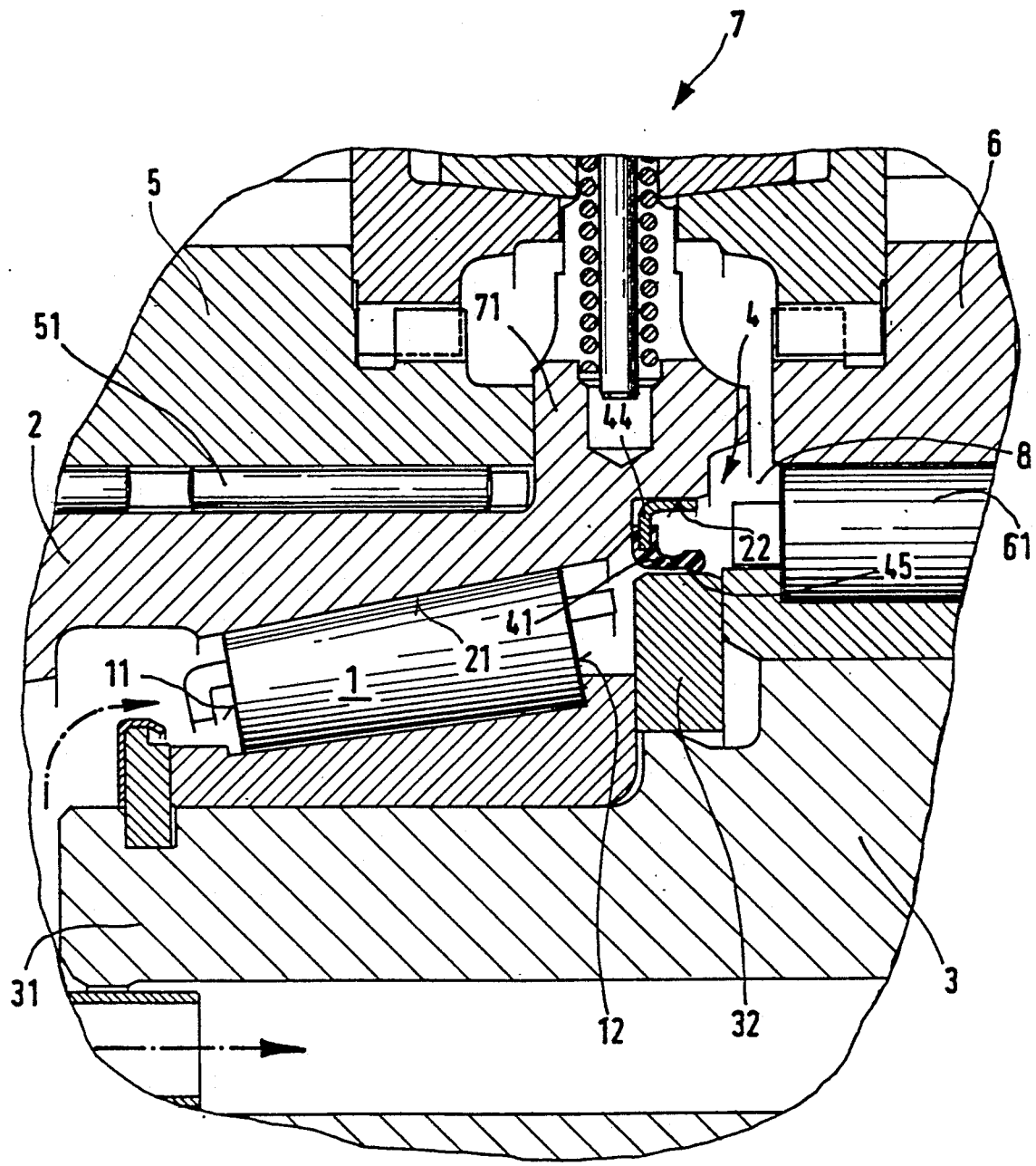
FIG. 1 shows, partly in section, a taper roller bearing as pilot bearing having an elastic rubber seal between an input and a main shaft of a transmission.

In FIG. 1 a pilot bearing 1, shown as taper roller bearing, is situated on a journal 31 of the main (second) shaft 3 and supported in a tapered axial bore 21 of the input (first) shaft 2. Integral with the input shaft 2 is the synchronizer hub 71 which, in a manner known per se, carries a double synchronizing clutch 7. The gear 5 on the input side of the input shaft 2 and the inner gear 6 are supported on the main shaft 3 via a needle bearing 51 and a roller bearing 61, respectively. A belt or drainage canal 8 for the lube oil (lubricating fluid) and the coolant extends predominantly radially outwardly between the input shaft 2, and especially the synchronizer hub 71 integral with said shaft, and the main shaft 3. The feeding of fluid takes place through the narrow dimension 11 of the pilot bearing 1 in order to utilize the natural pumping action of the taper roller bearing from the narrow dimension 11 to the broad dimension 12. As generally known, the oil current itself can be fed to the pilot bearing via an oil splash or centrifugal lubrication, for instance, combined with a stationary oil bath (oil sump), oil drip pans and adequate bores or ducts. But this device can also be supplemented by a simple pump having, for instance, a propeller or a conveyor disc and which contributes to a better conveyance of the lube oil to the radially inwardly situated pilot bearing 1. In the case of heavily loaded transmissions, the oil current can also be produced by generally known forced lubrication and be guided radially inwardly to the pilot bearing 1. An elastic seal is disposed in the drainage passage 8, that is behind the broad dimension 12 of the taper roller bearing 1, 4 and has a sealing lip 41 that seals the drainage passage 8 during downtime of the transmission while, during operation, the seal rises under the action of the rotation away from the seal ring 32 and allows unobstructed drainage of the lube oil.

In this embodiment, the elastic seal with an inelastic body 44, such as a sheet metal ring which carries the sealing lip 41, is pressed into a recess 22 in the input shaft 2. The sealing lip 41 is vulcanized on the body 44 and extends in an axial direction prior to its sealing bulb 45 resting, in an idle position, on the seal ring 32 situated on the main shaft 3.

Figure 2:
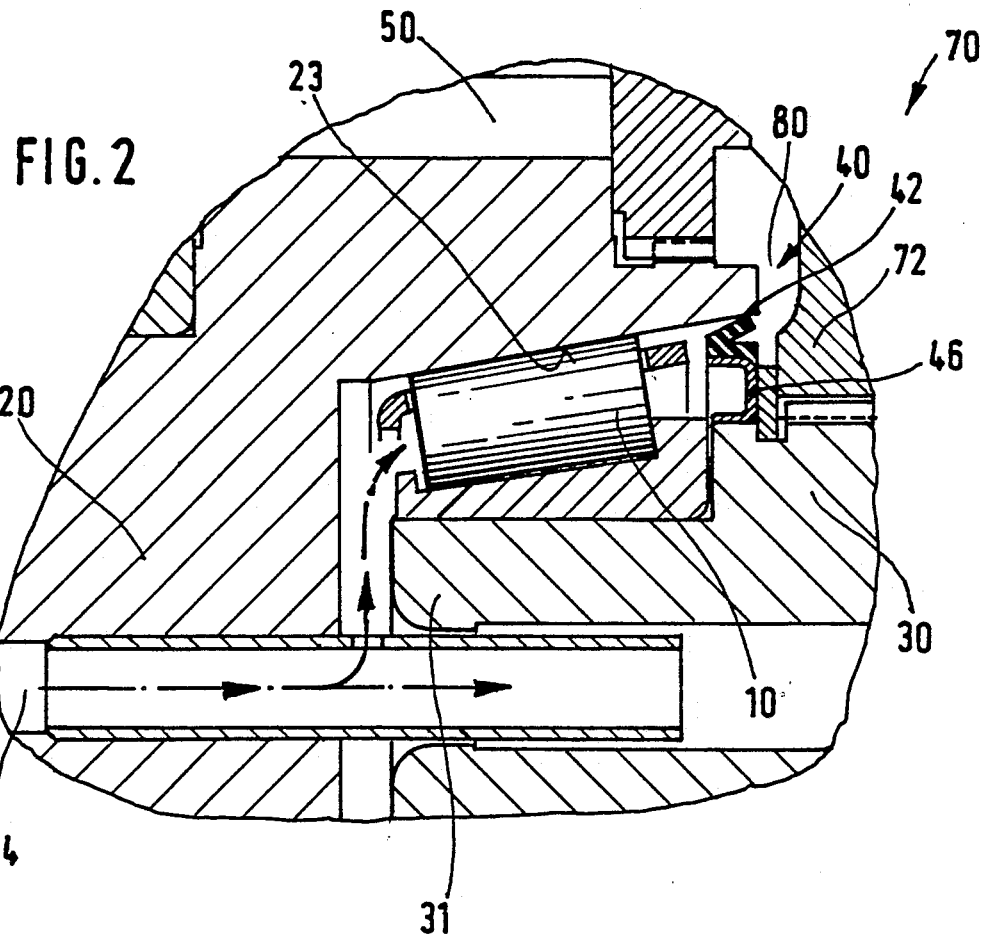
FIG. 2 shows, partly in section, an elastic seal on the journal of the main shaft upon which a taper roller bearing is also situated.

In a second embodiment according to FIG. 2, the elastic seal 40 is situated in the oil lube drain passage 80 and extends between the input shaft 20 and the main shaft 30. The gear 50, situated on the input side, is integrally connected with the input shaft 20 and the synchronizer hub 72 is non-torsionally and axially firmly situated on the main shaft 30. The annular body 46, which has a U-shaped cross-section and supports a V-shaped sealing lip 42, is fastened to the main shaft 30. The sealing lip 42 closes the oil drain passage 80 by abutting, during downtime, on a tapered axial bore 23. If the transmission is running, the lube oil is fed by a pump to the pilot bearing 10, for instance, via a lube oil bore 24 centrally situated in the input shaft 20. After the pilot bearing has been traversed, the sealing lip 42 of the elastic seal 40 is predominantly opened by this oil current so that during this period of time it is ensured that the lube oil drains through the drainage passage 80 and also lubricates and cools the synchronizing means 70 in the sump of the transmission that is not shown.

Figure 3:
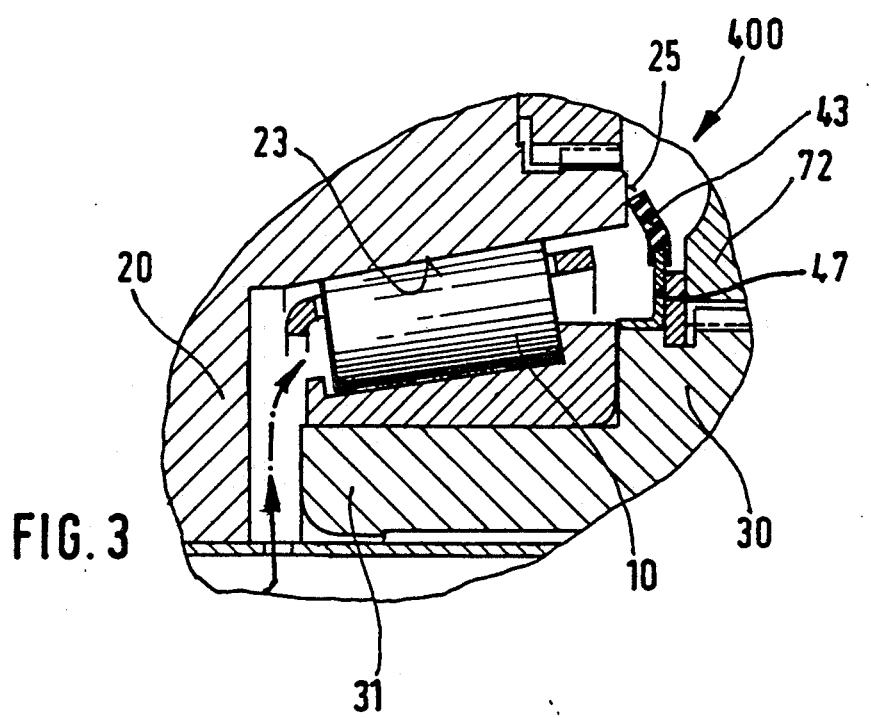
FIG. 3 shows, partly in section, another embodiment of an elastic seal arrangement according to FIG. 2.

The embodiment according to FIG. 3 is similar to the one of FIG. 2 except that the elastic seal 400 has an L-shaped body 47 and, during downtime, the sealing lip 43 rests on the front face 25 of the input shaft 20. The sealing lip 43 is opened during operation by the pressure of the lube oil being conveyed via the lube oil pump (not shown).

When the sealing lip 43 is adequately designed, this can aid with lifting of the sealing lip from the front face 25 by the rotation of the main shaft 30 upon which the elastic seal 400 has been situated.

| Reference Numerals | |
|---|---|
| 1, 10 | pilot bearing |
| 11 | narrow dimension (1st side) |
| 12 | broad dimension (2nd side) |
| 2, 20 | input shaft (shaft) |
| 21 | axial bore |
| 22 | recess |
| 23 | tapered bore |
| 24 | lube oil bore |
| 25 | front face |
| 3, 30 | main shaft |
| 31 | shaft journal |
| 32 | seal ring (ring) |
| 4, 40, 400 | elastic rubber seal |
| 41 | sealing lip |
| 42 | sealing lip |
| 43 | sealing lip |
| 44 | body |
| 45 | sealing bulb |
| 46 | body |
| 47 | body |
| 5, 50 | gear |
| 51 | needle bearing |
| 6 | gear |
| 61 | roller bearing |
| 7, 70 | synchronizing clutch |
| 71 | synchronizer hub |
| 72 | synchronizer hub |
| 8, 80 | drainage passage (belt canal) |

What is claimed is:

1. An oil lubrication system for a pivot bearing (1) of a transmission, a rotating input shaft (2) positioned around said bearing and situated opposite a coaxial main shaft (3), with lubricating oil being fed on one side (11) of said pivot bearing (1) and being drained radially outwardly on the other side (12) via an annular drainage channel (8) located between both said shafts, wherein an elastic rubber seal (4, 40, 400) is situated in said drainage channel (8, 80) between said two shafts and is attached to one of said two shafts, said elastic rubber seal engages a surface of the other of said two shafts and closes said drainage channel (8, 80) when the one of said two shafts (2) is inactive and disengages from the surface of the other of said two shafts to maintain said drainage channel (8, 80) freely open during operation as the one of said two shafts (2) rotates.

2. An oil lubrication system according to claim 1, wherein said elastic rubber seal (4) is secured to said transmission input shaft (2) which supports said pivot bearing (1) and has a sealing lip (41) and, when the transmission is inactive, said sealing lip (41) tightly abuts against the main shaft (3) or on a structural part (sealing ring 32) connected with said main shaft (3).

3. An oil lubrication system according to claim 2, wherein said sealing lip (41), as result of rotation of said transmission input shaft (2), disengages from said main shaft (3) due to centrifugal force.

4. An oil lubrication system according to claim 1, wherein said elastic rubber seal (40) is secured to said main shaft (30) and has a sealing lip (42) and, when the transmission is inactive, said sealing lip (42) tightly abuts directly on said input shaft (20) which outwardly supports said pivot bearing (10).

5. An oil lubrication system according to claim 4, further having a lubricating pump which conveys the lubricant for said pivot bearing (10), wherein said sealing lip (42, 43), when the transmission is running, is opened via lubricant pressure produced by said lubricating pump.

6. An oil lubrication system according to claim 3, wherein said pivot bearing is a taper roller bearing (1) which rests in a conic axial bore (21) of said transmission input shaft (2);
said seal (4) has a body (44) of angular cross section which is compressed into a recess (22) of said transmission input shaft (2); and
said sealing lip (41) is vulcanized on said angular body whereby said sealing lip (41) extends an axial direction and, when the transmission is inactive, a sealing bulge situated in the direction of flow of the lubricant at the end of said sealing lip (41) abuts against a sealing ring (32) situated on said main shaft (3).

7. An oil lubrication system according to claim 5, wherein said pivot bearing is a taper roller bearing (10) which rests in a conic axial bore (23) of said transmission input shaft (20);
said seal (40) has a body (46) of U-shaped cross section which has one leg pressed against said main shaft (30) and the other leg supports a vulcanized V-shaped sealing lip (42) which abuts against said conic axial bore (23) when the transmission is inactive.

8. An oil lubrication system according to claim 5, wherein said pivot bearing is a taper roller bearing (10) which rests in a conic axial bore (23) of said transmission input shaft (20);
said seal (400) has a body (47) of L-shaped cross section which has a short leg pressed against said main shaft (30) and has said sealing lip, vulcanized on its other leg, which abuts against a front face (25) of said transmission input shaft (20) when the transmission is inactive.

* * * * *